March 23, 1926. 1,578,147
F. L. LIPCOT
CUSHION CONNECTION FOR VEHICLE CONSTRUCTION
Filed March 27, 1924

INVENTOR.
Fred L. Lipcot
BY
Redding, Greeley, O'Shea & Campbell
ATTORNEYS.

Patented Mar. 23, 1926.

1,578,147

UNITED STATES PATENT OFFICE.

FRED L. LIPCOT, OF NEW YORK, N. Y., ASSIGNOR TO THE RUBBER SHOCK INSULATOR COMPANY, INC., OF NEW YORK, N. Y., A CORPORATION OF DELAWARE.

CUSHION CONNECTION FOR VEHICLE CONSTRUCTION.

Application filed March 27, 1924. Serial No. 702,185.

*To all whom it may concern:*

Be it known that I, FRED L. LIPCOT, a citizen of the United States, residing in the borough of Manhattan, of the city of New York, in the State of New York, have invented certain new and useful Improvements in Cushion Connections for Vehicle Construction, of which the following is a specification, reference being had to the accompanying drawings, forming a part hereof.

This invention relates to the type of connection between metallic parts of a motor vehicle shown, described and claimed broadly in Letters Patent of the United States No. 1,404,876 dated January 31, 1922, and in which yielding non-metallic material is interposed between the metallic parts so that one is supported from the other and mechanical forces are transmitted therebetween. More particularly, the invention is concerned with the conditions arising under the application of such type of connection between the spring and chassis of a motor vehicle. In such spring connections there are times when considerable force is transmitted from one part to another as, for, instance, in a so-called Hotchkiss drive where the driving forces to the vehicle frame are transmitted from the spring through the non-metallic yielding material. Conversely, such conditions may arise in such a type of drive through braking stresses. To a lesser degree, perhaps, the problem may be found in the front spring connection. For the purposes of this application the description will be addressed to a cushion connection of the character described interposed between the front end of the rear spring of a vehicle in which the Hotchkiss drive is employed.

The principal object of the invention is to provide a relatively large superficial area for transmission of the stresses from the spring to the non-metallic yielding material and vice versa. A further object of the invention is to provide for the transmission of such forces by means which relieve the seats for the non-metallic material of undue stresses. Still another object is to so form the spring parts as to take these stresses by eliminating the need of any interposed elements such as rivets which would have less strength. In accordance with the invention the spring leaf or spring leaves or spacer elements which support the non-metallic material or the seats therefor are so formed as to back up the material or the seats and transmit driving or braking forces from one to another without imposing any undue stresses on any other parts.

The invention will be described in greater particularity in connection with the embodiment illustrated in the drawings, wherein.

Figure 1:
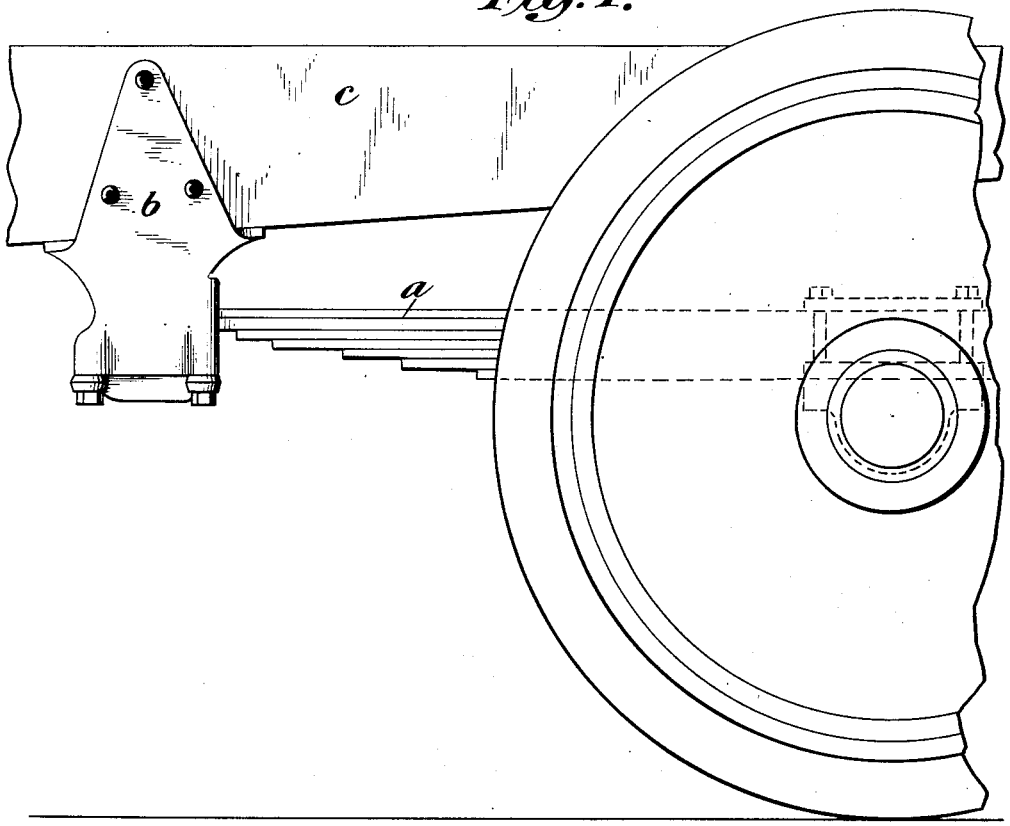
Figure 1 is a fragmentary view in side elevation showing conventionally a Hotchkiss type drive for a motor vehicle in which the improved cushion connection is interposed between the front end of the spring and the frame.
Figure 2:
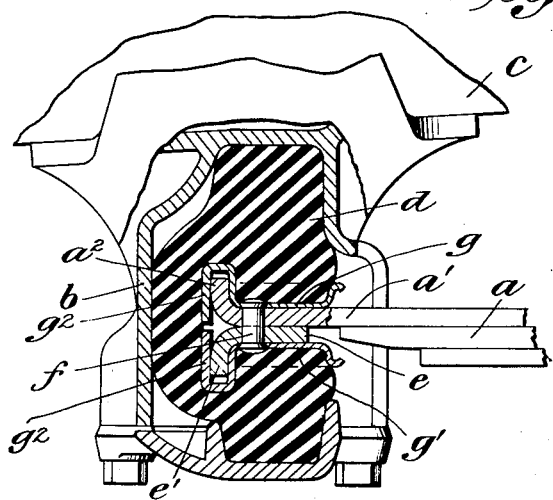
Figure 2 is a detailed view in section through the housing and rubber block of the connection shown in Figure 1 and illustrating the provision of means whereby the spring leaf and spacer element transmit forces most effectively between the spring and rubber.

The front end of the rear spring $a$ of the motor vehicle illustrated conventionally in Figure 1 extends into the open side of a housing $b$ carried with the frame $c$. Within this housing is confined non-metallic yielding material shown as a rubber block $d$ which receives the end of the spring $a$. By the connection described the frame is supported on the spring by a non-metallic connection and mechanical forces are transmitted from one metallic part to another through such non-metallic material. As shown, only the top spring leaf $a'$ extends into the block and this leaf carries a spacer element $e$ on its underside so that the columns of rubber above and below the spring, seat on the remote faces of the leaf $a'$ and the spacer element $e$, which may be secured together in any suitable way, as by a rivet $f$. Pressed steel cups or seats $g$, $g'$, may be riveted on these remote faces to receive the columns of rubber and hold them against displacement with respect to the parts on which it is seated. These cups or seats may be extended to provide flanges $g^2$ disposed generally at right angles to the seats and bearing against the rubber column at the end of the spring. With the construction thus far described it is evident that mechanical forces in transmission from the spring to the frame or vice versa will pass from the rubber to the spring or vice versa largely through the bearing surfaces afforded by the flanges $g^2$ on the cups $g$, $g'$. Such transmission in addition to impressing undue strains on the metal of the cups also impresses strains on the rivet $f$ by which they are secured to the spring leaf $a$ and spacer element $e$, respectively. The principal object of the present invention is to relieve all parts of such strains and incorporate directly within the spring leaf or the spacer element or both means by which mechanical forces will be taken directly by them. Such a provision is of particular importance in a Hotchkiss type drive both in connection with driving forces for the vehicle and braking forces. Where only one spring leaf, such as $a'$, enters the non-metallic material its end $a^2$ is formed at such an angle as will most effectively transmit forces from the spring to the rubber or vice versa. In the illustrated embodiment the end $a^2$ is bent substantially at right angles to the leaf $a'$. Similarly, the end $e'$ of the spacer element $e$ is bent. In constructions where cups $g$, $g'$, or the like are provided, the bent ends $a^2$, $e'$, may back up directly the flanges $g^2$ so that driving forces transmitted through them will be transmitted directly from the bent ends $a^2$, $e'$ and thence to the block as is most desirable.

As indicated hereinbefore the invention is not to be limited to the type of spring or its location nor to the provision of a spacer element such as $e$ nor to the use of separate cups or seats such as $g$, $g'$, nor is it concerned with details surrounding the construction of the connection per se.

What I claim is:

1. In combination with a leaf spring and a cushion connection of the character described, a spring leaf extending into the cushion connection and bent upwardly at substantially a right angle at its end and in force transmitting relation to the cushion connection, a spacer element carried on the underside of the spring leaf and having its end bent downwardly at substantially a right angle and in line with the said spring end whereby driving and braking forces are transmitted directly between the spring and cushion connection through said bent ends.

2. In combination with a leaf spring and a cushion connection of the character described, a spring leaf extending into the cushion connection and bent upwardly at substantially a right angle at its end, and in force transmitting relation to the cushion connection, a spacer element carried on the underside of the spring leaf and having its end bent downwardly at substantially a right angle and in line with the said spring end, whereby driving and braking forces are transmitted directly between the spring and cushion connection through said bent end, and metal seats carried on the said leaf and spacer element and formed to embrace said bent ends.

This specification signed this 25th day of March A. D. 1924.

FRED L. LIPCOT.